Dec. 22, 1925.                                                                                              1,566,941
                        F. G. WHITTINGTON
               ELECTRIC MOTOR FOR WARNING SIGNALS
                       Filed Sept. 13, 1920
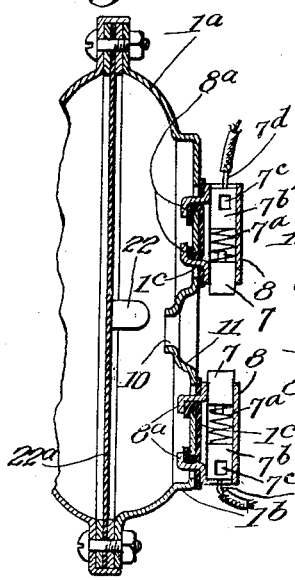
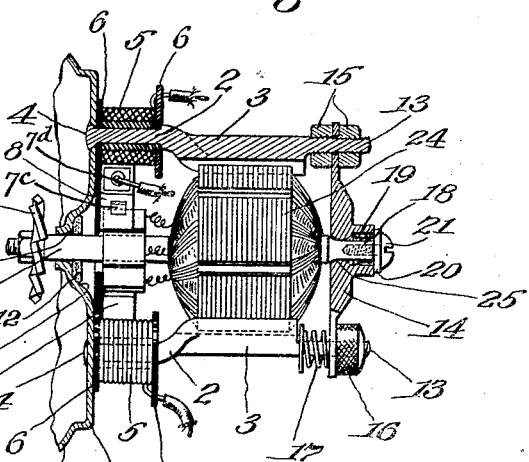
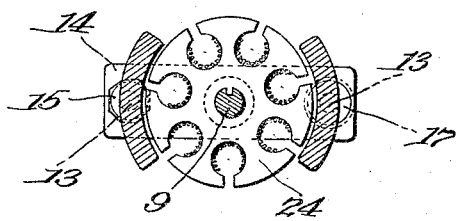
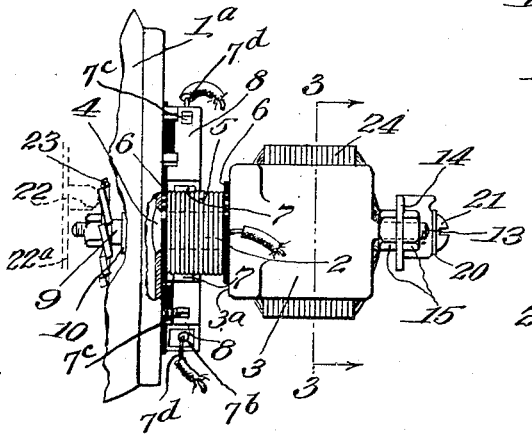
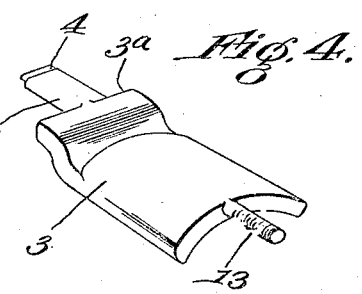
WITNESS:                                                                      INVENTOR:
                                                                    Frederik G. Whittington
                                                                 BY
                                                                              HIS ATTORNEYS Patented Dec. 22, 1925.

1,566,941

UNITED STATES PATENT OFFICE.

FREDERIK G. WHITTINGTON, OF CHICAGO, ILLINOIS, ASSIGNOR TO STEWART-WARNER SPEEDOMETER CORPORATION, OF CHICAGO, ILLINOIS, A CORPORATION OF VIRGINIA.

ELECTRIC MOTOR FOR WARNING SIGNALS.

Application filed September 13, 1920. Serial No. 409,792.

*To all whom it may concern:*

Be it known that I, FREDERIK G. WHITTINGTON, a citizen of the United States, residing at the city of Chicago, in the county of Cook and the State of Illinois, have invented certain new and useful Improvements in Electric Motors for Warning Signals, of which the following is a specification, reference being had to the accompanying drawings, forming a part thereof.

The purpose of this invention is to provide an improved signal horn with an electric motor of compact and economical construction. It consists in the elements and features of construction shown and described as indicated in the claims.

In the drawings:

Figure 1 is a side view of the motor with parts in section, shown attached to the horn shell which is fragmentally shown.

Figure 2 is a top plan view of the same.

Figure 3 is a section at the line, 3—3, on Figure 2.

Figure 4 is a perspective view of one of the pole pieces.

Figure 5 is a section through the brush fittings taken axially with respect thereto.

The construction of the motor here shown departs from the ordinary design in that the usual frame is eliminated, the several component parts being mounted upon and attached to the shell of the signal horn. The pole pieces, 2—2, are secured by riveting them at 4—4, to the part of the shell, 1ª, which forms a cover for the diaphragm, 22ª. This part 1ª, of the shell, as indicated in Figure 5, affords a means of mounting the motor parts and the diaphragm which are all rigidly secured thereto, thus insuring the desired relation of the motor and the diaphragm being maintained, this part, 1ª, of the shell constituting what might be termed a base for the motor.

The pole pieces, 2, 2, are enlarged at 3, 3, forming shoulders, 3ª, and the field coils, 5, 5, are wound between the said shoulders and the shell, 1ª, insulating washers, 6, 6, may be interposed at each end of the coils as shown.

The brushes, 7, 7, are mounted in slideway fittings, 8, 8, which are also secured to the part, 1ª, and co-operate with the commutator in the usual and well understood manner, being thrust by the usual spring, 7ª, reacting against a block, 7ᵇ, which is removably retained by a key pin, 7ᶜ, the circuit wires being indicated at 7ᵈ. The fittings, 8, 8, are in the form of rectangular tubing and have tangs, 8ª, struck out from one side which occupy openings, 1ᶜ, in the casing beyond which they are bent for securing them in position. The details of the brushes, beyond their associated fittings, 8, 8, form no part of this invention, and need no further description.

The motor shaft, 9, projects through the cover member, 1ª, and is afforded a bearing, 10, formed therein by striking out and drawing the metal thereof longitudinally of the shaft. A recess, 11, is formed concentric and adjacent to the bearing to provide room for introducing a washer, 12, made of felt or other absorbent material which is intended to be saturated with a lubricant to serve the bearing, 10, and is held in place by snugly fitting the recess or in any well known manner.

The pole pieces are extended beyond the field coils and parallel to the shaft, 9, of the motor and each terminates, at the end remote from that at which it is secured to the casing, 1ª, in a threaded stem, 13. A yoke, 14, spans the stems, 13, and is held in position by the securing nuts, 15, at one end, and by the knurled thumb nut, 16, at the other end. Coiled about one of the stems, 13, below the yoke, 14, is a spring, 17, the purposes of which will be hereinafter described. The shaft, 9, is journaled as stated, at 10, in the casing, 1, and also at 18, in the yoke, 14. The bearing, 18, is formed with the pocket, 19, surrounding the shaft, and which may also have a lubricant-absorbing material packed therein for serving the journal. The pocket, 19, is closed with a washer, 20, held in place by a screw, 21, which is threaded in the end of the shaft, 9.

On the end of the shaft, 9, which projects through the cover 1ª, is a ratchet-faced wheel, 23, which operates the diaphragm of the horn by actuating a button, 22, projecting from the diaphragm as shown. The intermittent contact of the parts, 22 and 23, results in a longitudinal motion of the shaft, 9, it being understood that the magnetic pull of the pole pieces tends to control the position of the armature, 24, carried on the shaft, 9, yieldingly opposing the motion resulting from the contact just referred to.

To neutralize the shock of the rebound incident to the motion due to the magnetic influence of the pole pieces on the armature, the spring, 17, is provided.

It is well known that by changing the proximity of the parts, 22 and 23, that is, causing the wheel, 23, to rotate in a plane nearer to or farther from the button, 22, the tone of the horn will be modified. The means for so doing, as here shown, is the thumb nut, 16, co-operating with the spring, 17, which will operate in the following manner.

If, for instance, the loudness of tone of the horn is desired to be increased, the thumb nut, 16, will be advanced, carrying one end of the yoke with it causing it to fulcrum about the opposite end, and the shaft having its reduced end portion journaled in the yoke will be moved toward the diaphragm, carrying the wheel, 23, with it toward the contact button, 22; a reverse motion will, of course, reduce the loudness, the spring, 17, at all times serving as a means to securely hold the adjusting nut, 16, by friction. To accommodate the swinging action of the yoke, 14, and to prevent cramping, or binding the shaft, the bearing for the shaft in the yoke, 14, is rounded in cross-section as indicated at 25.

It is intended that the motor be covered by a housing, not shown, which may be secured to the shoulder, 1ᵇ, of the part, 1ª, in any desirable or convenient manner so that it may be easily removed to gain access to the adjusting thumb nut, 16. The arrangement of the coils 5, substantially in line with the pole-pieces 3, and at one end of the armature instead of circumferentially outside the latter, results in a very compact design, leaving plenty of clearance space within such a housing for the necessary connecting wires.

I claim:

1. In combination with a signal horn comprising a vibratory member, a shell in which said vibratory member is mounted, said shell having its outer wall at one side of said member provided with a shaft-bearing opposite the vibratory member; an electric motor having its rotating armature shaft journaled in said bearing and field coil cores mounted directly on the outer side of said shell wall having said bearing.

2. In the construction defined in claim 1, foregoing, motor brush slideways mounted on the outer side of said shell wall having a shaft bearing, and brushes mounted in said slideways.

3. In combination with a signal horn comprising a vibratory member, a shell in which said vibratory member is mounted, the outer wall of said shell at one side having a bearing for the motor armature opposite the vibratory member; an electric motor having its rotating armature shaft journaled in said bearing; field coil cores mounted directly on said outer shell wall and projecting therefrom parallel to the armature shaft, the cores of said field coils being extended to form pole pieces positioned in the zone of the rotating armature; motor brush slideways mounted on the outer side of said shell wall, and brushes and their actuating springs in said slideways.

4. In combination with a signal horn comprising a vibratory member and a shell by which it is supported, a motor provided with a ratchet-faced wheel on one end of its shaft adapted to actuate said vibratory member, said motor having an armature and including pole pieces supported on the shell and end portions extending parallel to the shaft beyond the armature, and a yoke connecting said extending end portions providing a combined thrust bearing and journal bearing for one end of the motor shaft, means for adjustably securing the yoke at its junction with one of the pole pieces, and means for securing it at the other pole piece with capacity for fulcruming thereon.

5. In the combination defined in claim 4 a spring under the adjustable end of said yoke for absorbing the rebound shock of the motor shaft imparted thereto by the reaction of the ratchet-faced wheel and vibratory member.

6. In the combination defined in claim 4 the walls of the journal bearing in said yoke being longiudinally curved to provide clearance in the bearing when the yoke is adjusted.

7. In the combination defined in claim 4 the ends of said pole pieces being threaded and the ends of the yoke being thinned, clamping nuts securing one end of the yoke to one pole piece, a spring on the other pole piece under the end of the yoke and an adjusting nut holding the yoke against the spring.

8. In combination with a signal horn comprising a vibratory member and a shell in which it is mounted, the motor for actuating the vibratory member comprising a rotating armature and a shaft therefor, the shell having a journal bearing for said shaft; means for supporting the commutator brushes of the motor on the shell and brushes mounted thereby adjacent to the shaft journal bearing, field coils for the motor, and core members therefor mounted directly upon the shell and extended to form pole pieces positioned in the zone of the armature; the zone of the coils being offset along the armature axis from the zone of the armature, and said coils extending transversely of said axis inwardly toward said axis past the zone of the armature produced, so that the coils project at their inner circumferences between the armature and the shell wall on which the coils are mounted.

In testimony whereof, I have hereunto set my hand at Chicago, Illinois, this 9th day of August, 1920.

FREDERIK G. WHITTINGTON.